Oct. 4, 1949.  C. R. A. GRANT  2,483,635
PRESSURE GAUGE
Filed Oct. 3, 1946
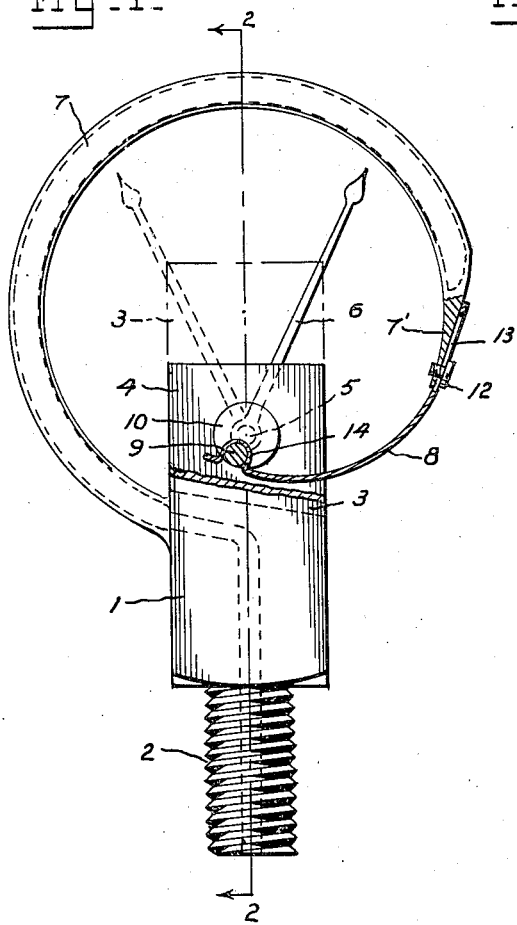
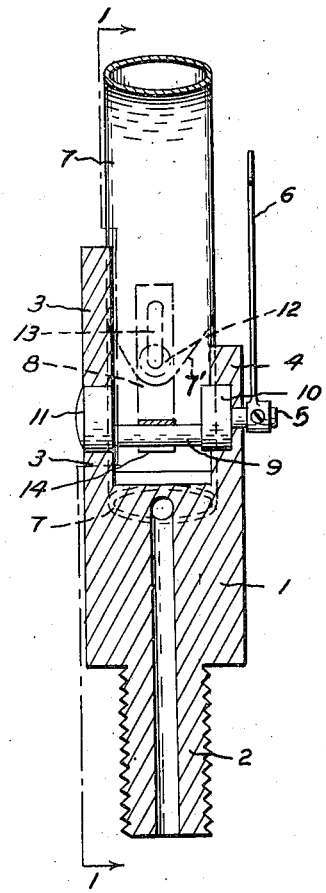
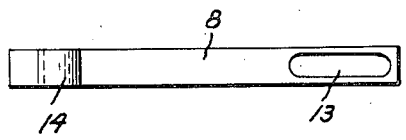
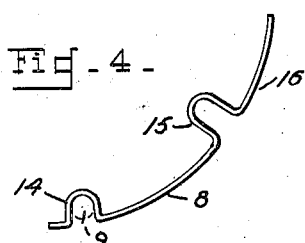
INVENTOR.
Charles R. A. Grant,
BY
ATTORNEY Patented Oct. 4, 1949

2,483,635

UNITED STATES PATENT OFFICE 2,483,635

PRESSURE GAUGE

Charles Robert Archibald Grant,
London, England

Application October 3, 1946, Serial No. 700,950
In Great Britain July 16, 1945

2 Claims. (Cl. 73—411)

This invention relates to pressure gauges and has for its object to provide a direct acting gauge, that is to say a gauge wherein a Bourdon tube has its free end connected substantially directly to a pointer moving over a dial.

According to the present invention a Bourdon tube has its free end connected by a link to a crank pin on a spindle carrying a pointer moving over a dial. In order to take up backlash the link is preferably in the form of a strip of resilient material such as spring steel. One end of the link may be connected adjustably to the free end of the Bourdon, or may include in its length an adjustable U-shaped loop.

The link may be provided at one end with an end piece for attachment to the free end of the Bourdon tube, whilst its other end is suitably shaped for engagement with the crank pin.

The invention will now be described by way of example with reference to the accompanying drawings, wherein:

Figure 1 is a rear view in elevation and partially in section on line 1—1 of Fig. 2 of a pressure gauge embodying the present invention;

Figure 2 is a section on the line 2—2 of Figure 1 but with the pointer in the broken line position of Fig. 1 and with the opposite end of the Bourdon tube and connecting link shown in phantom lines; and Figures 3 and 4 show details.

Referring first to Figures 1 to 3, a pressure gauge is provided in the usual manner with a hollow post 1, of which one end is screw threaded externally as shown at 2 for engagement with a container, pipe or the like in which is contained, or through which passes, a fluid under pressure. The end of the post is preferably forked as indicated at 3, 4 and in the forked end 3, 4 is rotatably mounted a spindle 5, to which is secured a pointer 6 for movement over a graduated dial (not shown) secured to the post 1. To the post 1 is also secured one end of a Borudon tube 7, which communicates with the hollow interior of the post 1. The other or free end 7' of the Bourdon tube 7 is connected by a link 8 to a crank pin 9 on the pointer spindle 5. For this purpose the pointer spindle 5 is cranked, the cheeks 10, 11 of the cranked portion being in the form of circular discs, mounted in circular openings in the parts 3, 4, between which the end of the link 8 engages with the crank pin 9. The other end of the link 8 is connected to the free end 7' of the Bourdon tube 7 by an adjustable connection so as to enable the pointer 6 to be adjusted conveniently with the zero position of the scale. The adjustable connection, as shown in Figs. 1–3, may comprise a slot 13 in the end of the strip 8 and a screw 12 inserted through the slot and threaded into an aperture in the free tube end 7'.

The link or strip 8, at the end thereof adapted to engage with the crank 9, is preferably formed as a resilient loop 14, which enables it to be engaged readily and effectively with the crank pin 9, whilst its other end is slotted, as shown at 13, for adjustable connection to the free end of the Bourdon tube 7 by the screw 12.

Instead of connecting the strip 8 adjustably to the free end 7' of the Bourdon tube 7, the strip 8, as shown in Figure 4, is provided intermediate its ends with an adjustable U-shaped loop 15, which enables the pointer 6 to be adjusted relatively to the zero position of the dial. In this case the strip 8 is provided with an end piece 16 for securing to the free end 7' of the Bourdon tube 7.

A gauge according to the invention is inexpensive to produce, simple in construction, and strong. Backlash is taken up by making the link 8 resilient. By forming the link 8 of strip material a large area is presented for wear, with the maximum lightness.

What I claim is:

1. In a pressure gauge the combination comprising a hollow post having a forked end, a Bourdon tube secured at one end to said post in communication with the interior thereof, a spindle rotatably mounted in said forked end, a pointer secured to said spindle, said forked end having circular openings therein, circular discs on said spindle, said discs engaging said circular openings, a crank pin located between said discs, a link having a resilient loop at one end thereof, said resilient loop engaging with said crank pin, said link having a slot in its other end, and a screw engaging said slot and secured to the other end of said Bourdon tube.

2. In a pressure gauge the combination comprising a hollow post having a forked end, a Bourdon tube secured at one end to said post in communication with the interior thereof, a spindle rotatably mounted in said forked end, a pointer secured to said spindle, said forked end having circular openings therein, circular discs on said spindle, said discs engaging said circular openings, a crank pin located between said discs, a link having a resilient loop at one end thereof, said resilient loop engaging with said crank pin, said link being connected at its other end directly to the other end of said Bourdon tube, said link having an adjustable loop intermediate its ends.

CHARLES ROBERT ARCHIBALD GRANT.

REFERENCES CITED

The following references are of record in the file of this patent:

UNITED STATES PATENTS

| Number | Name | Date |
|---|---|---|
| 1,937,879 | Esbaugh | Dec. 5, 1933 |
| 1,987,673 | Ferrier | Jan. 15, 1935 |
| 2,247,102 | Sugden et al. | June 24, 1941 |